(12) United States Patent
Alperovich et al.

(10) Patent No.: US 11,586,962 B2
(45) Date of Patent: Feb. 21, 2023

(54) ADAPTIVE DEVICE TYPE CLASSIFICATION

(71) Applicant: Avast Software s.r.o., Prague (CZ)

(72) Inventors: Galina Alperovich, Saint Petersburg (RU); Dmitry Kuznetsov, Yekaterinburg (RU); Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 478 days.

(21) Appl. No.: 16/725,906

(22) Filed: Dec. 23, 2019

(65) Prior Publication Data

US 2020/0210871 A1 Jul. 2, 2020

Related U.S. Application Data

(60) Provisional application No. 62/786,244, filed on Dec. 28, 2018.

(51) Int. Cl.
*G06N 7/00* (2006.01)
*G06N 5/02* (2023.01)
*G06N 20/00* (2019.01)

(52) U.S. Cl.
CPC .......... *G06N 7/005* (2013.01); *G06N 5/027* (2013.01); *G06N 20/00* (2019.01)

(58) Field of Classification Search
CPC ......... G06N 7/005; G06N 20/00; G06N 5/027
See application file for complete search history.

(56) References Cited

U.S. PATENT DOCUMENTS

| 5,917,808 | A | 6/1999 | Kosbab | |
|---|---|---|---|---|
| 2020/0136937 | A1* | 4/2020 | Savalle | G06F 16/289 |
| 2020/0211721 | A1* | 7/2020 | Ochoa | G06N 20/20 |

OTHER PUBLICATIONS

Peter Higgins, Ben Lowery, Dojo Tool Kit Refrence Guide, Website. Published by Dogo. Accessed on Sep. 4, 2021. Accessed at: https://dojotoolkit.org/reference-guide/1.10/dojo/sniff.html.

(Continued)

*Primary Examiner* — Michael A Keller
(74) *Attorney, Agent, or Firm* — Avek IP, LLC; William B. Kircher

(57) ABSTRACT

Systems and methods for device type classification system include a rules engine and a machine learning engine. The machine learning engine can be trained using device type data from multiple networks. The machine learning engine and the rules engine can receive data for devices on a network at a first point in time. The data can be submitted to a rules engine and the machine learning engine, which each produce device type probabilities for devices on the network. The device type probabilities from the rules engine and the machine learning engine can be processed to determine device types for one or more devices on the network. As more data becomes available at later points in time, the additional data can be provided to the rules engine and the machine learning engine to update the device type determinations for the network.

18 Claims, 7 Drawing Sheets

(56) References Cited

OTHER PUBLICATIONS

Meidena, Yair, et al., ProfilloT: A Machine Learning Approach for IoT Device Identification Based on Network Traffic Analysis. Published by Department of Software and Information Systems Engineering, Ben-Gurion University, Beer-Sheva, Israel and Singapore University of Technology and Design, Singapore. Apr. 2017. Accessed at: https://dl.acm.org/doi/pdf/10.1145/3019612.3019878.

Miettinen, Markus, et al. IoT Sentinel: Automated Device-Type Identification for Security Enforcement in IoT. Researchers from: Technische Universitat Darmstadt, Aalto University, Espoo, Finland; Germany; University of Helsinki, Finland. Dec. 13, 2016. Accessed at: https://arxiv.org/pdf/1611.04880.pdf.

Martin, Jeremy, et al. Decomposition of MAC Address Structure for Granular Device Inference. ACSAC '16, Dec. 5-9, 2016, Los Angeles, CA. pp. 78-88. Accessed at: https://www.cmand.org/furiousmac/furiousMAC.pdf.

* cited by examiner

| PORTS | MAC | VENDOR | PROT | RESPONSE | DEVICE TYPE |
|---|---|---|---|---|---|
| [ 67, 1900, 2869 ] | 4c:0b:be:44:39:37 | MICROSOFT | DHCP | hostname: XboxOne<br>classid: MSFT 5.0<br>paramlist: 1,3,6,15,31,33,43,44,46,47,121,249,252 | GAME CONSOLE |
| [ 80, 443, 1900] | e0:88:5d:7f:fa:95 | TECHNICO | UPNP | '<?xml version="1.0"?><br><ROOT<br>XMLNS="URN:SCHEMAS-UPNP-ORG:DEVICE-1-0"><br>  <DEVICE><br>    <DEVICETYPE>URN:SCHEMAS-UPNP-ORG:DEVICE:<br>INTERNETGATEWAYDEVICE:1</DEVICETYPE><br>    <FRIENDLYNAME>ZYXEL KEENETIC<br>...... | ROUTER |
| [ 88, 443, 554, 1900, 5353 ] | 00:0e:53:27:5c:ac | AVTECH | HTTPS | '<html>\n<head>\n<link rel="icon" href="/nobody/favicon.ico" TYPE="IMAGE/VND.MICROSOFT.ICON" />\n<LINK REL="SHORTCUT ICON" HREF="/NOBODY/FAVICON.ICO" TYPE="IMAGE/VND.MICROSOFT.ICON" />\n<LINK REL="BOOKMARK" HREF="/NOBODY/FAVICON.ICO" TYPE="IMAGE/VND.MICROSOFT.ICON" />\n<META HTTP-EQUIV="CONTENT-TYPE" CONTENT="TEXT/HTML; CHARSET=UTF-8">\n<META NAME="GOOGLEBOT"<br>...... | SECURITY CAMERA |

FIG. 5

| Protocol | Pattern | Device type | Confidence |
|---|---|---|---|
| DHCP | (?i)SAMSUNG[-_:]Network[-_:]Printer | PRINTER | 0.90 |
| UPnP | contains "hub2" in "Device type" | IOT_HUB | 0.90 |
| DHCP | (?i)iTV match in "Device type" | TV | 0.80 |
| mDNS | (?i)RackStation\.local\. | NAS | 0.90 |
| HTML | (?i)Polycom - (?:SoundPoint IP )?(?(?:SoundStation IP )?Configuration | IP_PHONE | 0.85 |
| mDNS | (?i)_ipp(s\|-tls)?\._tcp\.local\. | PRINTER | 0.70 |
| FTP | (?i)[0-9]{3} (ECOSYS [a-z0-9]+) FTP server | PRINTER | 0.80 |
| mDNS | (?i)_nanoleaf(?:api\|ms)?\._tcp\.local\. | LIGHTING | 0.90 |
| HTTP | (?i)(t1\-[wm]d?r[0-9]+[a-z]+)(?:\(?:t1)?([wm]d?r[0-9]+[a-z]*))? | ROUTER | 0.80 |
| SSDP | (?i)ipos\[0-9]+ UPnP[0-9]+ Archer (?:c\[wm\]r)[0-9]+[a-z]*)([0-9]+)/ | ROUTER | 0.85 |

ADAPTIVE DEVICE TYPE CLASSIFICATION

RELATED APPLICATIONS

This Application claims priority to U.S. Provisional Patent Application Ser. No. 62/786,244, filed on Dec. 28, 2018, entitled "ADAPTIVE DEVICE TYPE CLASSIFICATION,", the entire disclosure of which is incorporated herein by reference.

FIELD

The disclosure relates generally to network systems, and more particularly to adaptively classifying devices in a network.

BACKGROUND

Networks once connected a relatively limited number of device types. For example, a network device would typically be some type of computer and a network communication device such as a router or switch. In today's networks, many different device types from many different sources can be connected to a home or corporate network. For example, there has been a vast increase in the presence of network devices on home and corporate networks. In addition to traditional computing systems, a typical network can include smart phones, printers, scanners, smart televisions, set top boxes, and Internet of Things (IoT) devices.

It is often desirable to be able to know what type of device is on a network. For example, device identification can be important for network security. Different types of devices have different vulnerabilities. Further, knowledge of device type can be important for a product's usability. For example, it may be desirable for a product to provide list of devices and device types to a user. Moreover, knowledge of devices and device types on a network can be useful for data analysis for market research and marketing purposes.

BRIEF DESCRIPTION OF THE DRAWINGS

For a better understanding of the inventive subject matter, reference may be made to the accompanying drawings in which:

FIG. 5 provides an example of various types of data and data values used to identify device types on a network.

FIG. 6 provides an example set of rules used to identify device types on a network.

DETAILED DESCRIPTION

Figure 1:
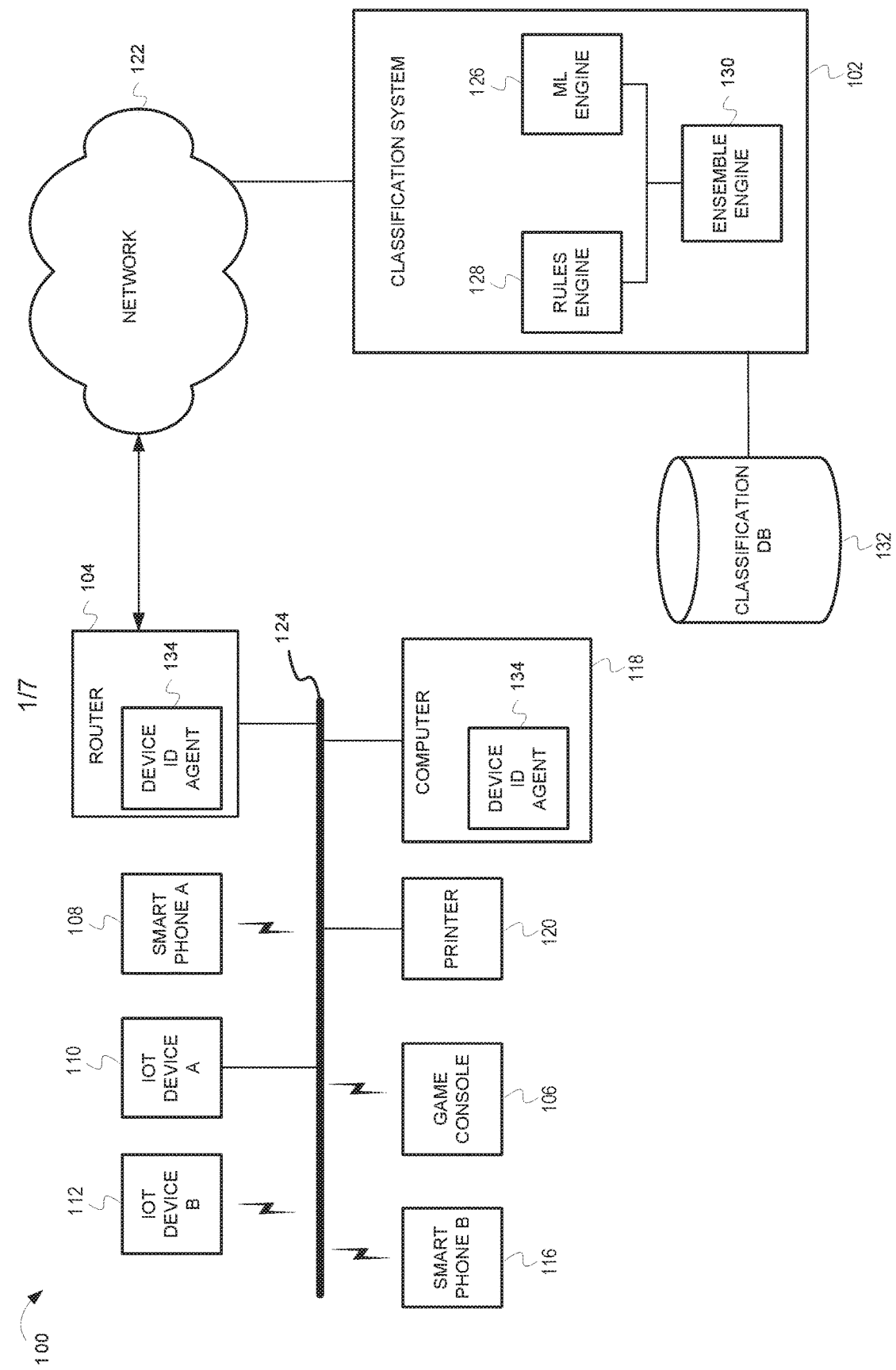
FIG. 1 is a block diagram illustrating an example system to identify device types on a network according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating an example system 100 to identify device types on a network according to embodiments. In some embodiments, system 100 can include a classification system 102 communicably coupled to a local network 124 via a network 122. Local network 124 can be a wired network, a wireless network, or a combination of the two. In some embodiments, local network 124 can be a home network. In alternative embodiments, local network 124 can be a network in a small business or a corporate network. Network 122 can be any collection of one or more wired networks, wireless networks, or combinations of the two that cover a greater domain than local network 124. In some aspects, network 122 can be one or more networks that make up the Internet.

In the example illustrated in FIG. 1, local network 124 includes a router 104, game console 106, IoT devices 110, 112, smart phones 108 and 116, computer 118, and printer 120. An IoT device (e.g., IoT devices 110, 112) can be any type of device that can includes a processor and a network interface to communicate data via local network 124 and/or network 122. Examples of such devices include, but are not limited to smart televisions, smart home appliances, cameras, sensors, biochips, office devices, implantable medical devices, and vehicle based devices.

Computer 118 can be a server computer, a laptop computer, a tablet computer, a set-top box, or any other device having a processor and memory enabling the device to execute programs.

Smart phones 108 and 116 can be any type of smart phone. Examples of smart phones include Android based smart phones, iPhones, and Windows phones. The embodiments are not limited to any particular type of smart phone. Smart phone 108 may be the same type of phone as smart phone 116, or it may be a different type.

Router 104 forwards network data between local network 124 and network 122. Router 104 can be a standalone router, a wireless router or access point, a modem/router or any other device that forwards data between two networks.

In some aspects, a device ID agent 134 can scan for devices on network 124. For example, the device ID agent 134 can perform an Address Resolution Protocol (ARP) scan and use the ARP responses to build a list of devices on the network and their associated Media Access Control (MAC) addresses. Further, the device ID agent 134 can actively and/or passively monitor the network. In active monitoring, the device ID agent 134 can send requests to a device and receive a response. For example, the device ID agent 134 can do a port scan of a device to determine open ports on the device. the device ID agent 134 can then send probe requests to selected open ports. Further the device ID agent 134 can issue HTTP requests to selected devices of interest (e.g., devices on which an HTTP interface was opened by a browser).

In passive monitoring (also referred to as snooping or sniffing), device ID agent 134 monitors packets on network 124 that have been transmitted by devices on the network. For example, device ID agent 134 can monitor DHCP requests made by devices on the network 124.

The device ID agent 134 can provide the data obtained from the active and/or passive monitoring above to classification system 102. For example, device ID agent 134 can monitor network traffic on network 124 and provide selected portions of the packet data to classification system 102.

Device ID agent 134 can be a standalone application, or it can be part of another application or application suite. For example, the device ID agent 134 can be part of an antivirus or other anti-malware software suite executing on a computer 118 or any of devices on network 124 (e.g., devices 106-120). Further, the device ID agent 134 can execute on router 104.

Classification system 102 can receive data from device ID agent 134. In some embodiments, classification system 102 can include a machine learning engine 126, a rules engine 128, and an ensemble engine 130. Classification system 102 can receive data resulting from scans and monitoring of local network 124, for example from device ID agent 134. As an example, classification system 102 can receive Internet Protocol (IP) addresses, Media Access Control (MAC) addresses, open port data, Dynamic Host Control Protocol (DHCP) data, Hypertext Transfer Protocol (HTTP) data, multicast Domain Name Service (mDNS), DNS data, DNS-SD data, Universal Plug and Play (UPnP) data, and File Transfer Protocol (FTP) data. The MAC address can be used to identify a vendor. The list of open ports on a device can be used to identify running services on the device. The UPnP data can identify a device's manufacturer or model name, and can identify the capabilities of the device (e.g., a network storage device, printer device etc.). mDNS data can provide similar information as UPnP data. DHCP data identifies the host name, class ID, and a system sequence of numbers, which can be used to identify an operating system running on the device. HTTP data from authentication and/or administration interfaces to a device can be used to assist in identifying the type of device. As an example, a printer may provide a web-based interface for printer management and configuration. The HTTP data provided by such interfaces may include keywords that can be useful for device type identification. Continuing with the printer example, HTTP data received from a management interface of the printer may include the words "print," "color," "paper" etc. The appearance of such terms in the HTTP data can be used to infer that the device providing the HTTP data is a printer. All of the aforementioned types of data can be used individually or in various combinations to predict a device type for a device.

Classification system 102 can provide this data to a machine learning engine 126 and a rules engine 128. The machine learning engine 126 can receive the data and use the data to predict device types based on the data along with confidence levels for the predictions.

Rules engine 128 can apply rules to the data and to predict device types along with confidence levels for the predictions. In some aspects, the rules used by the rules engine 128 can be rules that represent domain expert knowledge encoded within the set of rules.

Ensemble engine 130 can receive the predicted device types and confidence levels from the machine learning engine 126 and rules engine 128, and use the predicted device types and confidence levels to assign device types to the devices on a local network 124.

Classification system 102 can store rules used by the rules engine 128, models used by the machine learning engine 126, and input data obtained from scanning local network 124 in classification database 132.

In some embodiments, device ID agent 134, in addition to providing data to classification system 102, can also receive information from classification system 102. For example, device ID agent 134 can classify devices on network 124 based on rules that can be received from classification system 102. Further, device ID agent 134 can provide information to classification system 102 about a device on network 134 and receive a response indicating a device type for the device.

It should be noted that although only one local network 124 is illustrated in FIG. 1, classification system 102 can receive data from many different local networks 124. The data received from the many different local networks 124 can be used to train the machine learning engine. Once trained, models produced by the machine learning engine can then be used as described above to provide device type predictions and confidence levels.

The number and types of devices illustrated in FIG. 1 are to be considered as an example. Those of skill in the art having the benefit of the disclosure will appreciate that a network 124 can include more or fewer devices and device types than that illustrated in FIG. 1.

Figure 2:
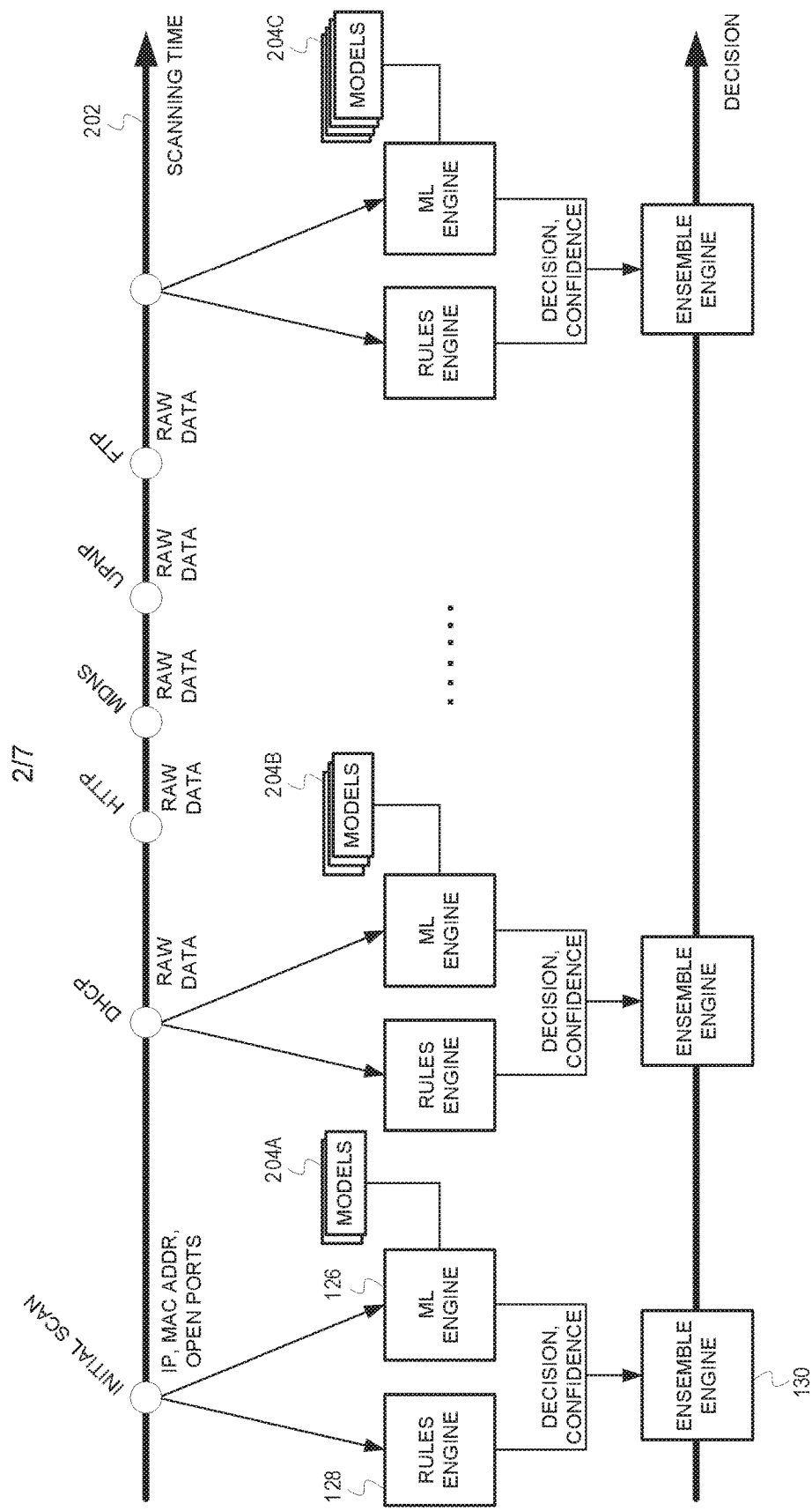
FIG. 2 is a diagram illustrating a timeline of operations in a system for identifying device types on a network.

FIG. 2 is a diagram illustrating a timeline of device type classification in a system for identifying device types on a network. In the example illustrated in FIG. 2, a scanning timeline 202 proceeds from left to right. As time progresses, the machine learning engine 126 and rules engine 128 receive data, for example from a device ID agent 134. For example, during an initial scan time period, the machine learning engine 126 and rules engine 128 receive IP addresses, MAC addresses, and open port data for devices on a local network. Using the initial scan data, the machine learning engine 126 and rules engine 128 provide device type decisions and confidence levels in the decisions to the ensemble engine 130, which then provides a decision as to the device types.

As time progresses, more data can be provided to the machine learning engine and rules engine. For example, at a later point in time, DHCP data may become available. The machine learning engine and rules engine can use the DHCP data along with the initial scan data to update the predictions and confidence levels. The updated predictions and confidence levels can be used by the ensemble engine to update the device type decisions if necessary. As time further progresses, more data may become available to the rules engine and the machine learning engine. For example, HTTP data, mDNS or DNS data, UPnP data, and FTP data may become available over time.

As can be seen from the above, at each iteration, the machine learning engine can extract more features and apply different models (and classifiers) to the extracted features. For example, at a first iteration, models 204A may be used based on the features extracted from the initial scan data. At a second iteration, models 204B may be used based on additional features extracted from DHCP data. At a later iteration, models 204C may be used by the machine learning engine based on features extracted from the HTTP, mDNS, UPNP and/or FTP data. Thus, at each iteration, updated data can be provided to the machine learning engine and rules engine, which can provide further updated predictions and confidence levels regarding the device types. The ensemble engine can then use the updated predictions and confidence levels to provide updated decisions as to the device types on a local network.

As will be appreciated from the above, a network scan can be performed in stages. At first, the scan can identify the devices present on the network, and retrieve base information about the devices. At subsequent stages, the system can scan devices more deeply and obtain more detailed information. At each stage, the system can produce a prediction (e.g., a "best guess") as to the device type. Thus, the system is adaptive as new data is made available.

Figure 3:
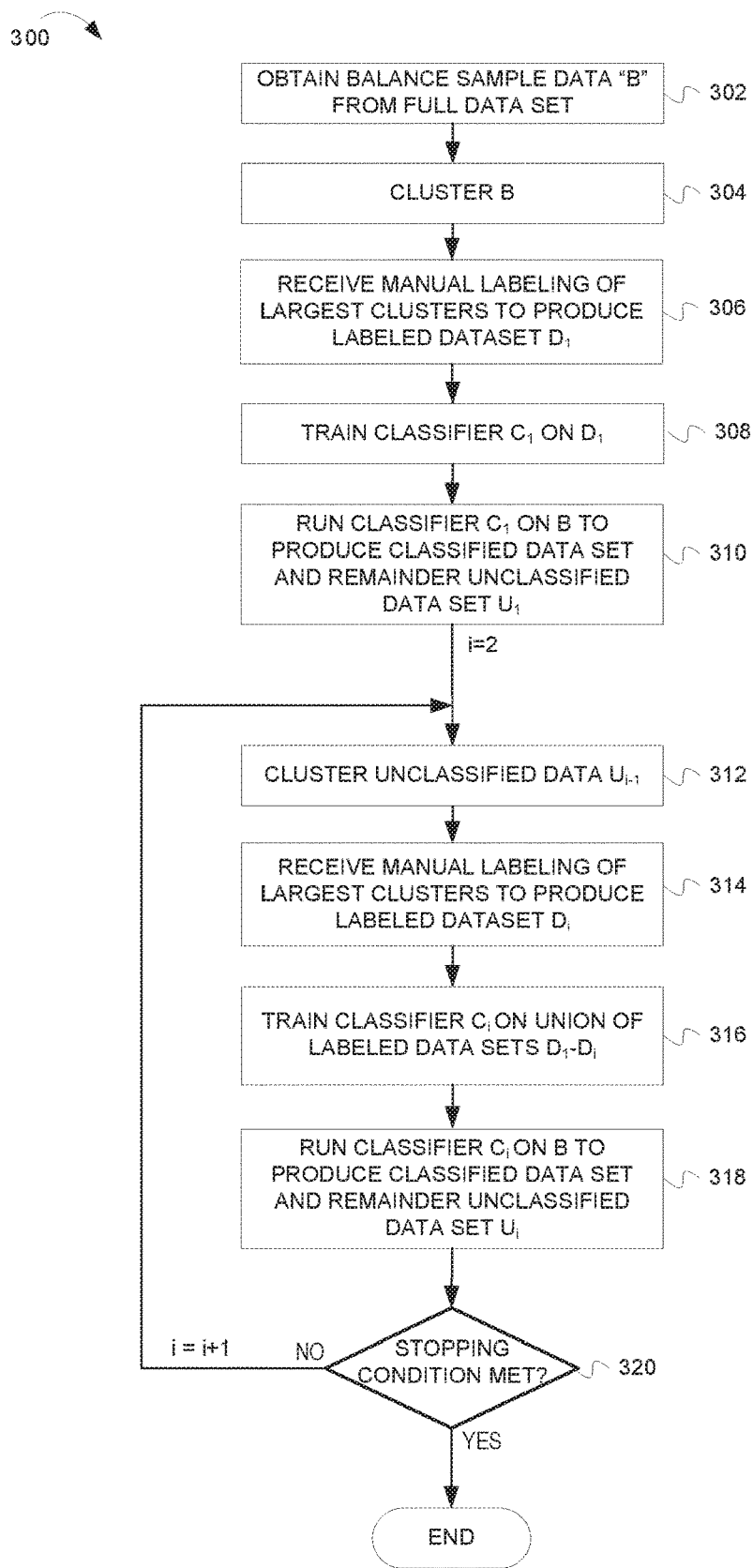
FIG. 3 is a flow chart illustrating operations of a method for training a classification system to identify device types on a network according to embodiments.

FIG. 3 is a flow chart illustrating operations of a method for training a classification system to identify device types on a network according to embodiments. In some aspects, the training comprises an iterative semi-supervised training procedure that combines clustering, classification, and domain expert knowledge into the training.

At block 302, the system obtains a balanced sample data set B from a full data set (i.e., the entire current classification database). In some aspects, the system can sample the full data set to acquire an approximately equal number of devices of each device type in the full data set. For example, the rule based classification system can be applied to the full data set to predict device types of devices in the full data set, and then sampled to create B.

At block 304, the system clusters B using a clustering algorithm. In some aspects, the DBSCAN algorithm can be used to cluster the data. The data may be processed prior to clustering. As an example, vendor information can be extracted from MAC addresses (every vendor has its own assigned range of MAC addresses). The results of a port scan can provide open ports on each device. A set can then be constructed for every device which contains its vendor ID and port numbers (e.g., the set {Apple, 80, 5353} can represent an Apple device with two ports open—80 and 5353).

In some embodiments, the clustering algorithm uses a distance between sets of data values to determine if a set belongs in a cluster. In some aspects, a Jaccard distance is used as the distance value between two sets of data values. However, the embodiments can use other distance measurements. For example, a Euclidian distance can also be used.

At block 306, the system receives labels for the largest clusters (e.g., the clusters with the largest number of elements) to produce a labeled dataset $D_1$. In some aspects, a domain expert or other system user can provide the labels for the largest clusters. For example, the system can determine the largest clusters and provide a user interface for a domain expert or other user to provide labels for the cluster.

At block 308, the system trains a classifier (referred to as $C_1$) on the labeled dataset $D_1$. In some aspects, a "random forest" algorithm is used to train classifiers.

At block 310, the classifier $C_1$ is run on B. After the classifier is run, there are two subsets, a classified subset and an unclassified subset (referred to as $U_1$). $U_1$ comprises data that could not be classified by $C_1$.

Blocks 302-310 describe a first iteration (i=1) of the training procedure. Blocks 312-320 describe subsequent iterations (i=2 to n) of the training procedure.

At block 312, the unclassified data from the previous iteration is clustered.

At block 314, the system receives labels for the largest clusters to produce a labeled dataset $D_i$. In some aspects, a domain expert or other system user can provide the labels for the largest clusters via a user interface that can receive a label for a selected cluster from the domain expert. The number of clusters selected as the "largest" can be determined such that the selected number of clusters covers a predetermined or configurable percentage of the available data. Thus, the number of largest clusters can change from iteration to iteration.

At block 316, an updated classifier $C_i$ is trained on the union of all labeled data sets $D_1$ through $D_i$.

At block 318, the updated classifier $C_i$ is run on B set to produce a classified data set and a remainder unclassified data set $U_i$. As each iteration proceeds, the size of $U_i$ should be smaller than $U_{i-1}$, as the classifier improves its classification capability.

At block 320, a check is made to determine if a stopping condition has been satisfied. If a stopping condition has not been satisfied, the system proceeds to block 312 to start a new iteration using $U_i$ as the data to be classified. Various conditions can be used as a stopping condition. Examples of stopping conditions that can be used to end training include various combinations of one or more of the following:
  a fixed number of iterations have been performed
  no more resources are available to label unclassified data
  the classifier has achieved a predetermined or configurable accuracy
  the classifier is no longer improving (e.g., $U_i$ is nearly the same size as $U_{i-1}$)

clustering no longer satisfies clustering quality measures (e.g., Silhouette score, the Calinski-Harabasz criterion, or other quality measures for unlabeled data)

Figure 4:
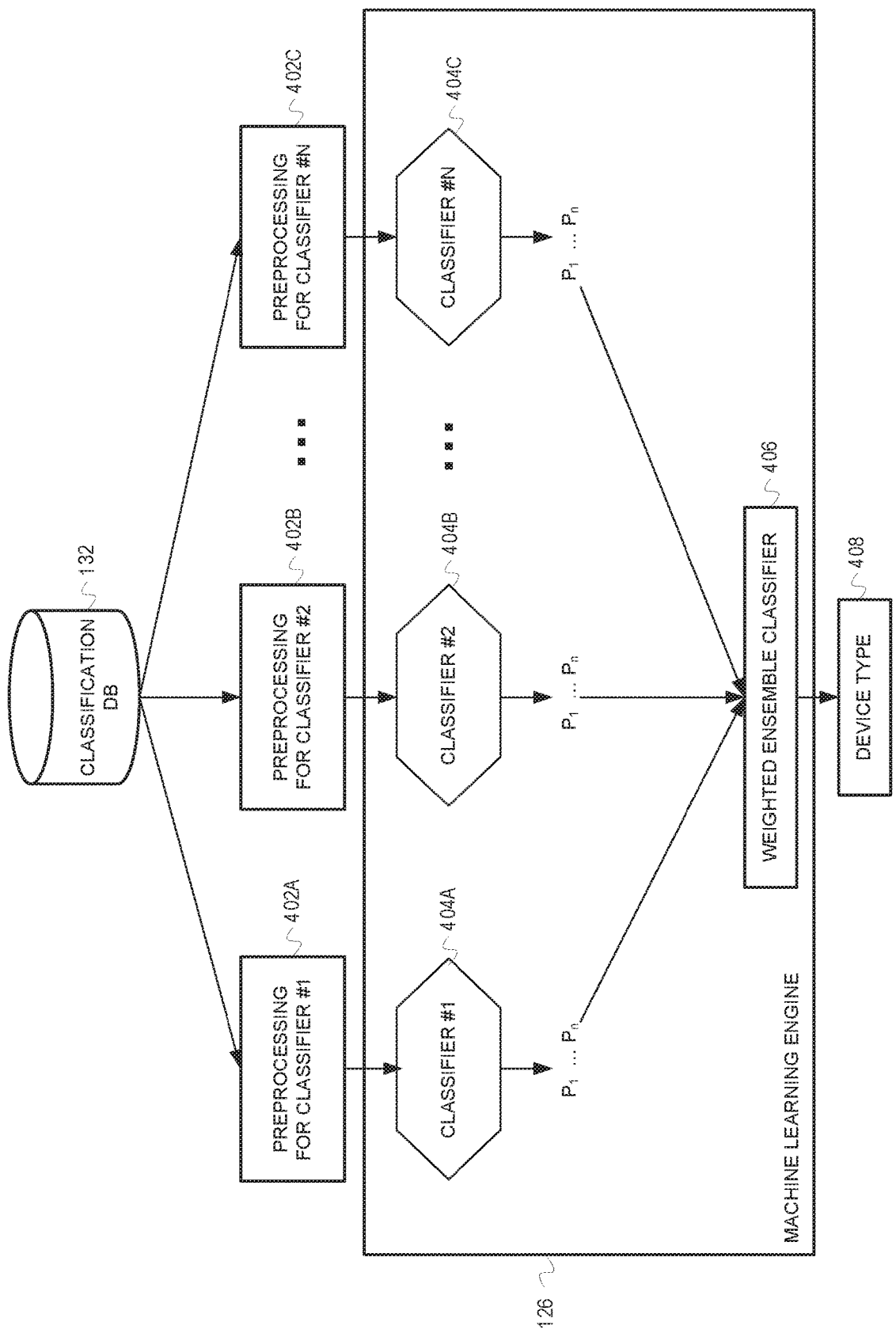
FIG. 4 is a diagram illustrating ensemble processing of data received in a request from a device ID agent according to embodiments.

FIG. 4 is a diagram illustrating ensemble processing of data received in a request from a device ID agent. In some embodiments, a machine learning engine 126 includes classifiers 404A-C (referred to generically as classifier 404), where the classifiers are independently trained for each data type or protocol used to classify devices.

A preprocessing element 402A-C can convert raw input data into a form that is suitable for the classifier 404A-C that corresponds with the preprocessing element 402A-C. This is desirable because a classifier typically works with its own data type or protocol and thus uses different features extracted from the raw data. In some aspects, HTTP, mDNS and UPnP data text data can be preprocessed to extract text data. For example, for HTTP data, the Hypertext Markup Language (HTML) data can be preprocessed to extract text portions of the HTML data. The extracted text portions can be parsed into tokens. In some aspects, term frequency-inverse document frequency (TF-IDF) vectors can be constructed using the text tokens. The set of words can be thus represented as a vector, where the $i^{th}$ element in the vector represents the $i^{th}$ word of the vocabulary used. This can allow the classifier to be used on numeric vectors of equal length. As another example, open port and vendor information (obtained via MAC address) can be preprocessed to a vector. For instance, assume that there are 50 possible vendors and 100 possible open ports. A vector having a length of 150 elements can be constructed, where there is an element for each possible vendor and open port. A "1" value in a vendor element indicates that the device was manufactured by the vendor and a "1" value in a port element indicates that the corresponding port is open. A "0" value indicates that the device is not made by the vendor or that the port is not open. For example, assume that the $11^{th}$ element of the vector corresponds to a first device manufacturer and that the $12^{th}$ element corresponds to a second manufacturer. A "1" value in the $11^{th}$ element would indicate that the device was made by the $11^{th}$ manufacturer and a "0" value in the $12^{th}$ element would indicate that the device was not made by the $12^{th}$ manufacturer.

A classifier produces a set of probabilities $P_1$-$P_n$, where a $P_n$ indicates the probability of the $i^{th}$ device type based on the feature. In some aspects, each classifier 404 produces its own probability set independent of the other classifiers.

A weighting algorithm 406 can combine the set of probabilities received from each of the classifiers 404. In some embodiments, the weighting algorithm comprises a maximum weighted probability algorithm, where a device type 408 is predicted that corresponds to the highest probability in the combined set. In some aspects, a probability set from a particular classifier 404 can be weighted by a coefficient that can be determined in various ways. For example, the coefficient can be determined according to quality of the particular classifier 404 with respect to a particular device type. This weighting can be determined based on data collected during the training described above with respect to FIG. 3. The quality of a classifier can be determined according to a classification accuracy measure. Such measures include precision, recall, F1, etc.

As an example, consider a classification model $C_i$. During training, assume that model $C_1$ demonstrated a classification accuracy of $A_{ij}$ on a device type $D_j$. Thus, in some aspects, a final formula for the aggregation model can be argmax[j] ($A_{ij}*P_{ij}$) for $i^{th}$ classifier and $j^{th}$ device type. Thus, device type 408 can be the final device type ($D_j$) where j is obtained as argmax defined above.

FIG. 5 provides an example of various types of data and data values used to identify device types on a network. In the example illustrated in FIG. 5, open port data 502, MAC address data 504, Vendor data 506, Protocol data 508 and response data 510 have been used to identify a device type 512.

FIG. 6 provides an example set of rules used to identify device types on a network. In the example illustrated in FIG. 6, a protocol 602 can have an associated pattern 604 (i.e., a rule). If the protocol data received from a device matches the pattern, then the rule is satisfied and the rule determines that the device has the device type shown in column 606. Confidence 608 represents the level of confidence in the identification based on the rule. In some aspects, a domain expert can assign the confidence level associated with a rule. As an example, a rule may be if UPnP data received from a device contains the string "hub2" in a "Device type" field of the data, then the rules engine can determine that the device is an IOT_HUB type of device with a 90% level of confidence.

As will be appreciated from the above, the embodiments comprise an ensemble model for analyzing network data. The model can include a set of independent classifiers that handle specific device data and parameters. The embodiments can use a hierarchical structure where a network can be scanned repeatedly to obtain more data about a device, with the data becoming more complex and specific. Further, the hierarchical structure can include both domain expert knowledge encoded in a rule set and machine learning models based on training classifiers. The predictions from the rule set and the machine learning models can be fed to an ensemble system to produce device type decisions at a higher level of robustness and accuracy than conventional systems. Thus, the embodiments are an improvement to conventional systems.

Figure 7:
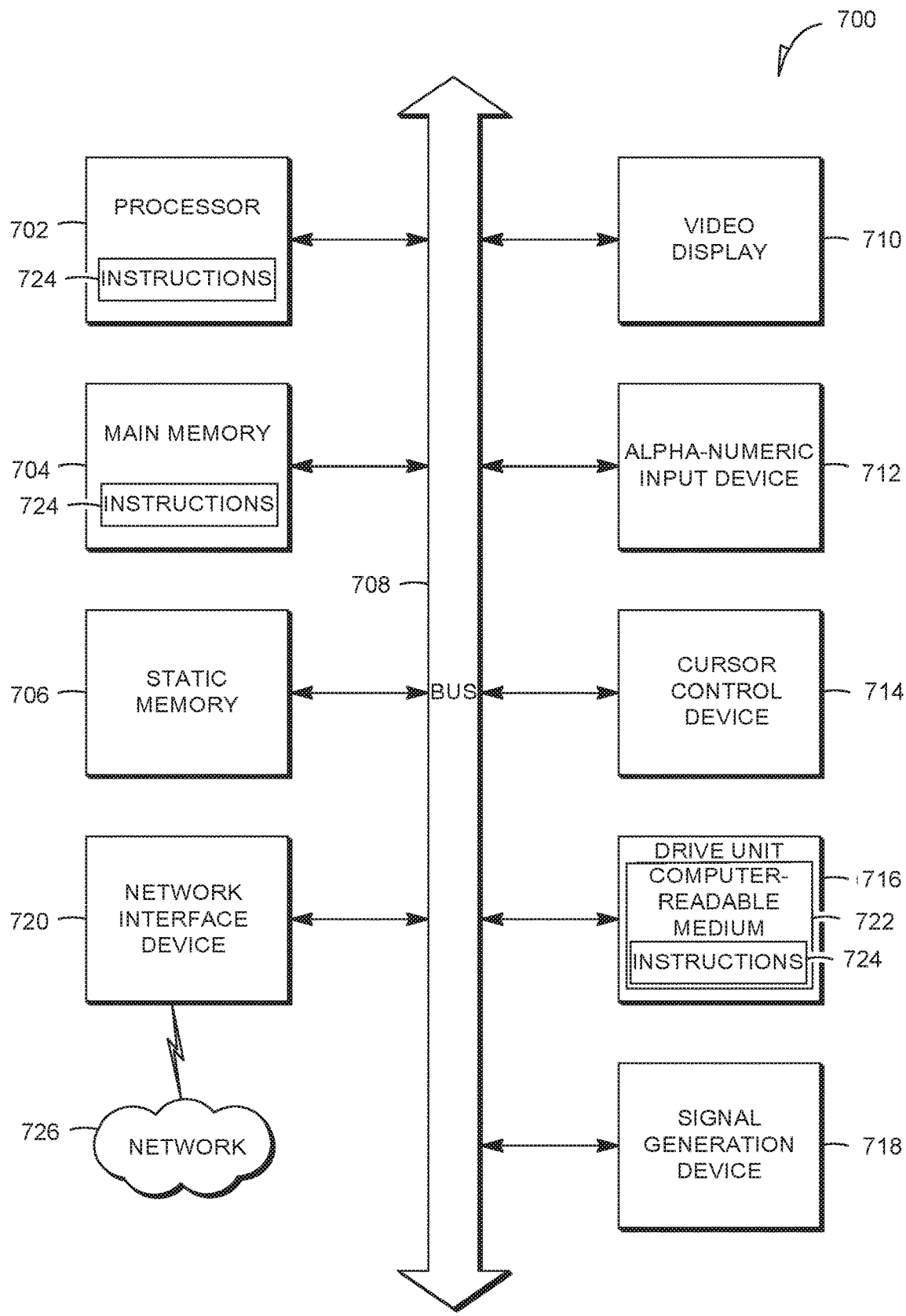
FIG. 7 is a block diagram of an example embodiment of a computer system upon which embodiments of the inventive subject matter can execute.

FIG. 7 is a block diagram of an example embodiment of a computer system 700 upon which embodiments of the inventive subject matter can execute. The description of FIG. 7 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 7 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for classifying device types on a network, the method comprising:
   training a machine learning model, comprising:
      receiving device data from a plurality of devices on a plurality of networks;
      determining a data set from the device data;
      clustering the data set to produce a first set of clusters;
      receiving labels for a set of largest clusters in the first set of clusters to produce a labeled data set;
      training one or more classifiers of the machine learning model based on the labels to produce a classified data set and an unclassified data set; and
      repeating, until a stopping condition is met, the operations of:
         clustering the unclassified data set,
         receiving labels for the largest clusters in the unclassified data set to produce a labeled data set,
         training the one or more classifiers on a union of the labeled data set and one or more previously labeled data sets, and
         submitting the data set to the one or more classifiers to produce an updated classified data set and an updated unclassified data set;
   receiving, at a first point in time, first data about one or more devices on the network;

determining, by a rules engine, a first set of device type probabilities for the one or more devices based on the first data;

determining, using the machine learning model, a second set of device type probabilities for the one or more devices based on the first data; and determining device types for the one or more devices based on the first set of device type probabilities and the second set of device type probabilities.

2. The method of claim 1, further comprising:

receiving, at a second point in time, second data about the one or more devices on the network;

determining, by the rules engine, a third set of device type probabilities for the one or more devices based on the second data;

determining, using the machine learning model, a fourth set of device type probabilities for the one or more devices based on the second data; and updating device types for the one or more devices based on the third set of device type probabilities and the fourth set of device type probabilities.

3. The method of claim 1, wherein determining, using the machine learning model, the second set of device type probabilities for the one or more devices comprises:

providing a feature value extracted from the first data to a classifier for the feature, wherein the classifier is one of a plurality of classifiers for a plurality of features;

receiving a set of device probabilities from the classifier;

determining, based on the plurality of classifiers, a device type for a device of the one or more devices.

4. The method of claim 3, wherein the set of device probabilities includes a probability value for each of a set of device types, the probability value indicating the probability of the device type based on the feature value.

5. The method of claim 3, wherein each of the plurality of classifiers independently determines a corresponding set of device probabilities based on a combination of one or more features of the plurality of features, wherein the combination of one or more features provided to a corresponding classifier is different from the combination of one or more features provided to others of the plurality of classifiers.

6. The method of claim 1, wherein determining the data set from the device data comprises determining a balanced dataset from the device data.

7. A device classification system comprising:

one or more processors; and a machine-readable storage medium having stored thereon executable instructions that, when executed, cause the one or more processors to:

train a machine learning model, comprising:

receive device data from a plurality of devices on a plurality of networks;

determine a data set from the device data;

cluster the data set to produce a first set of clusters;

receive labels for a set of largest clusters in the first set of clusters to produce a labeled data set;

train one or more classifiers of the machine learning model based on the labels to produce a classified data set and an unclassified data set; and repeat, until a stopping condition is met, the operations of:

cluster the unclassified data set, receive labels for the largest clusters in the unclassified data set to produce a labeled data set, train the one or more classifiers on a union of the labeled data set and one or more previously labeled data sets, and submit the data set to the one or more classifiers to produce an updated classified data set and an updated unclassified data set;

receive, at a first point in time, first data about one or more devices on the network;

determine, by a rules engine, a first set of device type probabilities for the one or more devices based on the first data;

determine, using the machine learning model, a second set of device type probabilities for the one or more devices based on the first data; and determine device types for the one or more devices based on the first set of device type probabilities and the second set of device type probabilities.

8. The device classification system of claim 7, wherein the instructions further comprise instructions to cause the one or more processors to:

receive, at a second point in time, second data about the one or more devices on the network;

determine, by the rules engine, a third set of device type probabilities for the one or more devices based on the second data;

determine, using the machine learning model, a fourth set of device type probabilities for the one or more devices based on the second data; and update device types for the one or more devices based on the third set of device type probabilities and the fourth set of device type probabilities.

9. The device classification system of claim 7, wherein the instructions to determine, using the machine learning model, the second set of device type probabilities for the one or more devices comprise instructions to cause the one or more processors to:

provide a feature value extracted from the first data to a classifier for the feature, wherein the classifier is one of a plurality of classifiers for a plurality of features;

receive a set of device probabilities from the classifier;

determine, based on the plurality of classifiers, a device type for a device of the one or more devices.

10. The device classification system of claim 9, wherein the set of device probabilities includes a probability value for each of a set of device types, the probability value indicating the probability of the device type based on the feature value.

11. The device classification system of claim 9, wherein each of the plurality of classifiers independently determines a corresponding set of device probabilities based on a combination of one or more features of the plurality of features, wherein the combination of one or more features provided to a corresponding classifier is different from the combination of one or more features provided to others of the plurality of classifiers.

12. The device classification system of claim 7, wherein the instructions to determine the data set from the device data comprise instructions to determine a balanced dataset from the device data.

13. A machine-readable storage medium having stored thereon executable instructions that, when executed, cause one or more processors to:

train a machine learning model, comprising:

receive device data from a plurality of devices on a plurality of networks;

determine a data set from the device data;

cluster the data set to produce a first set of clusters;

receive labels for a set of largest clusters in the first set of clusters to produce a labeled data set;

train one or more classifiers of the machine learning model based on the labels to produce a classified data set and an unclassified data set; and repeat, until a stopping condition is met, the operations of:
cluster the unclassified data set,
receive labels for the largest clusters in the unclassified data set to produce a labeled data set,
train the one or more classifiers on a union of the labeled data set and one or more previously labeled data sets, and
submit the data set to the one or more classifiers to produce an updated classified data set and an updated unclassified data set;

receive, at a first point in time, first data about one or more devices on the network;

determine, by a rules engine, a first set of device type probabilities for the one or more devices based on the first data;

determine, using the machine learning model, a second set of device type probabilities for the one or more devices based on the first data; and determine device types for the one or more devices based on the first set of device type probabilities and the second set of device type probabilities.

14. The machine-readable storage medium of claim 13, wherein the instructions further comprise instructions to cause the one or more processors to:

receive, at a second point in time, second data about the one or more devices on the network;

determine, by the rules engine, a third set of device type probabilities for the one or more devices based on the second data;

determine, using the machine learning model, a fourth set of device type probabilities for the one or more devices based on the second data; and update device types for the one or more devices based on the third set of device type probabilities and the fourth set of device type probabilities.

15. The machine-readable storage medium of claim 13, wherein the instructions to determine, using the machine learning model, the second set of device type probabilities for the one or more devices comprise instructions to cause the one or more processors to:

provide a feature value extracted from the first data to a classifier for the feature, wherein the classifier is one of a plurality of classifiers for a plurality of features;

receive a set of device probabilities from the classifier;

determine, based on the plurality of classifiers, a device type for a device of the one or more devices.

16. The machine-readable storage medium of claim 15, wherein the set of device probabilities includes a probability value for each of a set of device types, the probability value indicating the probability of the device type based on the feature value.

17. The device classification machine-readable storage medium of claim 15, wherein each of the plurality of classifiers independently determines a corresponding set of device probabilities based on a combination of one or more features of the plurality of features, wherein the combination of one or more features provided to a corresponding classifier is different from the combination of one or more features provided to others of the plurality of classifiers.

18. The machine-readable storage medium of claim 13, wherein the instructions to determine the data set from the device data comprise instructions to determine a balanced dataset from the device data.

* * * * *